US005488692A

United States Patent [19]
Karasick et al.

[11] Patent Number: 5,488,692
[45] Date of Patent: Jan. 30, 1996

[54] SYSTEM AND METHOD FOR REPRESENTING AND MANIPULATING THREE-DIMENSIONAL OBJECTS ON MASSIVELY PARALLEL ARCHITECTURES

[75] Inventors: Michael S. Karasick, Ridgefield, Conn.; David R. Strip, Albuquerque, N.M.

[73] Assignee: International Business Machines Corporation, Armonk, N.Y.

[21] Appl. No.: 289,181

[22] Filed: Aug. 11, 1994

Related U.S. Application Data

[63] Continuation of Ser. No. 641,471, Jan. 15, 1991, abandoned.
[51] Int. Cl.$^6$ ........................................ G06F 3/14
[52] U.S. Cl. .................. 395/120; 395/800; 364/DIG. 2
[58] Field of Search .................................. 395/800, 119, 395/120, 133, 163

[56] References Cited

U.S. PATENT DOCUMENTS

| | | | |
|---|---|---|---|
| 4,890,242 | 12/1989 | Sinha et al. | 395/119 |
| 4,967,392 | 10/1990 | Werner et al. | 395/164 |
| 5,101,363 | 3/1992 | Rutkowski | 364/578 |
| 5,189,781 | 3/1993 | Weiss et al. | 29/527.2 |

OTHER PUBLICATIONS

Crocker et al., "An Editable Nonmanifold Boundary Representation", *IEEE Computer Graphics and Applications*, Mar. 1991, pp. 39–51.
Kevin J. Weller, "Topological Structures For Geometric Modeling", PhD. Thesis, Renssalaer Polytechnic Institute, New York, Aug. 1988.
A. Requicha, "Representations for Rigid Solids: Theory, Methods, and Systems", Computing Surveys, vol. 12, No. 4, Dec. 1980.
Atallah et al., "Efficient Parallel Solutions To Geometric Problems", 1985 IEEE, pp. 411–417.
Bernard Chazelle, "Computational Geometry on a Systolic Chip", IEEE Transactions on Computers, vol. c–33, No. 9, Sep. 1984, pp. 774–785.
Fuchs et al., "Pixel-Planes 5: A heterogeneous Multiprocessor Graphics System Using Processor-Enhanced Memories", Computer Graphics, vol. 23, No. 3, Jul. 1984, pp. 79–88.
Michael T. Goodrich, "Intersecting Line Segments in Parallel with an Output-Sensitive Number of Processors", Proceedings, pp. 127–136, Santa Fe, N.M., 1989.
Christoph M. Hoffmann, "The Problem of Accuracy and Robustness in Geometric Computation", Purdue Univ. Tech. Report CSD-TR-771, CAPO Report CER-87-24, Apr. 1988, pp. 1–28.
Michael Karasick, "On the Representation and Manipulation of Rigid Solids", Ph.D. Thesis, TR 89–976, Cornell University, Mar. 1989, pp. 1–135.
Kuratowski et al., "Set Theory", Studies In Logic and The Foundations of Mathematics, 1968, Chap. 1, pp. 1–44.
Laidlow et al., "Constructive Solid Geometry for Polyhedral Objects", Computer Graphics, pp. 161–170, Aug. 1986.

(List continued on next page.)

*Primary Examiner*—William M. Treat
*Attorney, Agent, or Firm*—Perman & Green

[57] ABSTRACT

A parallel computing system is described that comprises a plurality of uniquely labeled, parallel processors, each processor capable of modelling a three-dimensional object that includes a plurality of vertices, faces and edges. The system comprises a front-end processor for issuing a modelling command to the parallel processors, relating to a three-dimensional object. Each parallel processor, in response to the command and through the use of its own unique label, creates a directed-edge (d-edge) data structure that uniquely relates an edge of the three-dimensional object to one face of the object. Each d-edge data structure at least includes vertex descriptions of the edge and a description of the one face. As a result, each processor, in response to the modelling command, operates upon a small component of the model and generates results, in parallel with all other processors, without the need for processor-to-processor intercommunication.

6 Claims, 3 Drawing Sheets

OTHER PUBLICATIONS

Nakashima et al., "A Parallel Processing Technique For Set Operations Using Three-Dimensional Solid Modeling", Trans. Info. Proc. Soc. Japan, 30(10):1298–1308, Oct. 1989.

Aristides A. G. Requicha, "TM-28 Mathematical Models of Rigid Solid Objects", Production Automation Project, Nov. 1977, pp. 1–37.

Requicha et al., "TM-25 Constructive Solid Geometry", Production Automation Project, Nov. 1977, Tech. Memorandum 25, pp. 1–36.

Requicha et al., "Solid Modeling: A Historical Summary and Contemporary Asessment", IEEE CG&A, 1982, pp. 9–24.

Requicha et al., "Boolean Operations in Solid Modeling: Boundary Evaluation and Merging Algorithms", Proceedings of the IEEE, vol. 23, No. 1, Jan. 1985, pp. 30–44.

Rossignac et al., "SCG: A Dimension–independent model for pointsets with internal structures and incomplete boundaries", Geometric Modeling For Product Engineering, pp. 145–180.

Segal et al., "Partitioning Polyhedral Objects into Nonintersecting Parts", IEEE Computer Graphics & Applications, Jan. 1988, pp. 53–67.

Kevin J. Weiler, "Topological Structures For Geometric Modeling", Thesis, Rensselar Polytechnic Institute, Troy, N.Y., Aug. 1988, pp. 1–322.

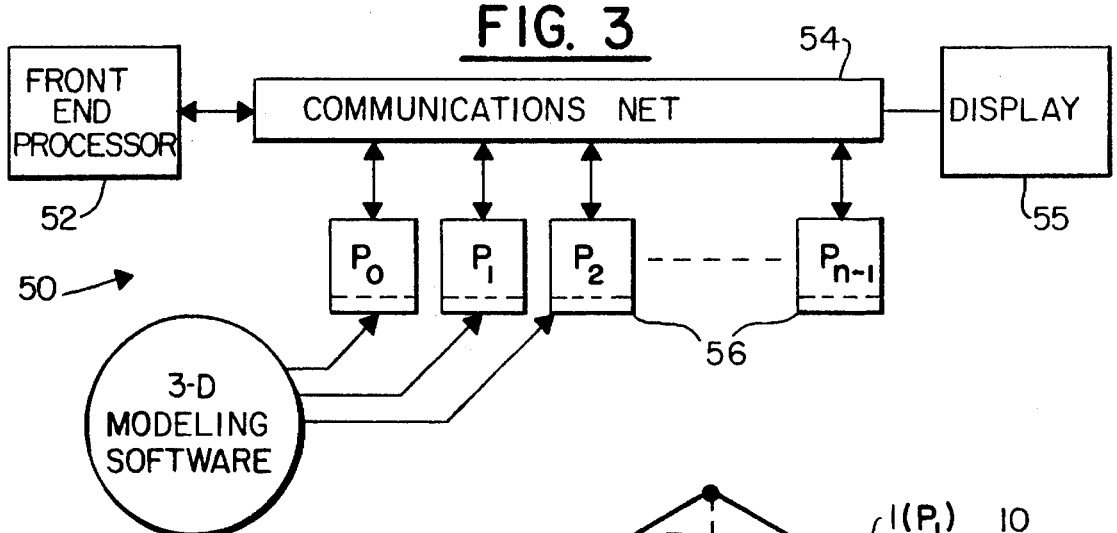
FIG. 3
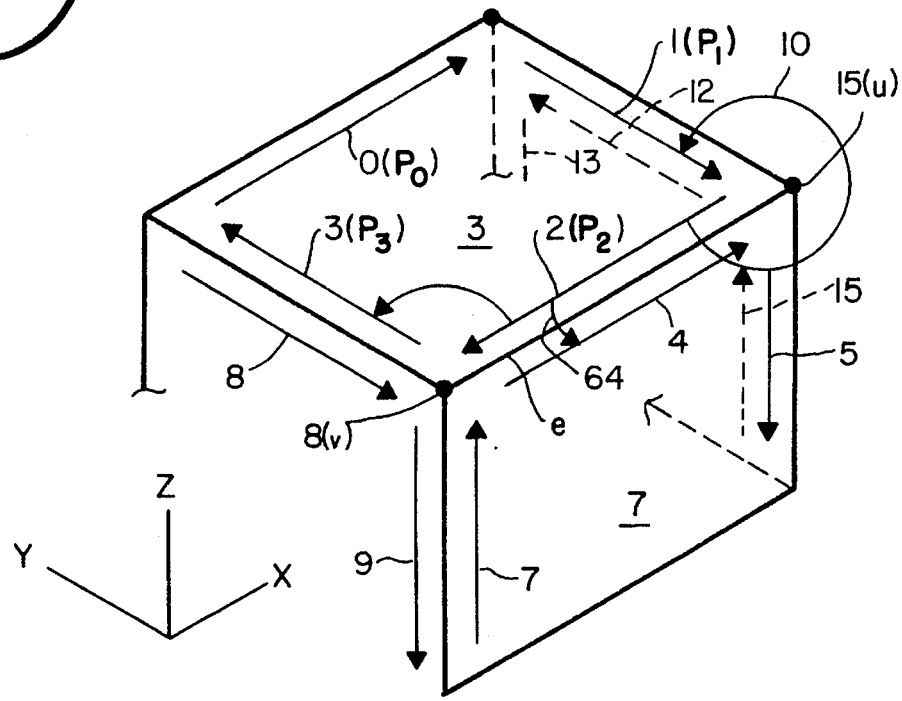
FIG. 4
| d-EDGE 2 | |
|---|---|
| INITIAL VERTEX LABEL | 15 |
| INITIAL VERTEX COORDINATES | (1,0,0) |
| INITIAL VERTEX SUCCESSOR (d-EDGE) | 1 |
| TERMINAL VERTEX LABEL | 8 |
| TERMINAL VERTEX SUCCESSOR (d-EDGE) | 3 |
| TERMINAL VERTEX COORDINATES | (0,0,0) |
| EDGE LABEL | 4 |
| SUCCESSOR AROUND d-EDGE 2 | 4 |
| FACE LABEL | 3 |
| FACE NORMAL | (0,0,1) |
| FACE DISTANCE | 0 |
| SOLID LABEL | ARB. |
| DIRECTION BIT | +1 |
FIG. 5

SYSTEM AND METHOD FOR REPRESENTING AND MANIPULATING THREE-DIMENSIONAL OBJECTS ON MASSIVELY PARALLEL ARCHITECTURES

The U.S. Government has rights in this invention pursuant to Contract No. DE-AC04-76DP00789, issued by the U.S. Department of Energy. This is a continuation of application Ser. No. 07/641,471 filed on Jan. 15, 1991, now abandoned.

FIELD OF THE INVENTION

This invention relates to massively parallel computing systems, and more particularly, to a system and method for creating and modifying geometric models on massively parallel architectures.

BACKGROUND OF THE INVENTION

Solid modelling underlies many aspects of computer-aided design and analysis, physical process simulation, robotics, computer vision and other computer-related tasks. Computational experiments using analogs of real processes, as applied to computer representations of physical objects, reduce the need for costly experimentation and prototyping of preliminary designs. Such experiments often require substantial amounts of computer time. Reduction of the processing time for such experiments allows more design alternatives to be examined in greater detail.

Three-dimensional objects or solids are most often represented using three fundamentally different schemes: Constructive Solid Geometry which describes a solid as an algebraic combination of primitive solids using set operations; Volumetric Decomposition which describes a solid as a disjoint union of simple solids; and Boundary Representation which describes a solid by enumerating zero, one, and two-dimensional portions of its boundary.

Set operations are of fundamental importance for all three kinds of representations. Independent of the basic representation of an object, all known set-operation algorithms require boundary representations or equivalent computations. Those set-operation algorithms require large amounts of computation time for several reasons. The algorithms are inherently intricate and this alone leads to long computation times. Moreover, interesting models tend to be large, and the computation times are a function of the size of the model.

Parallel computation using highly parallel processors has been suggested as a panacea for time-consuming computations, since it offers a way to increase the amount of computation power available as problem size increases. Special-purpose parallel computers have been built for modelling applications in computer graphics, but have not been shown to be useful for solid modelling applications. Such computers have been designed primarily to assist in the rendering of computer graphics images and not for the manipulation of the underlying representation of the geometric objects. Recently, a parallel architecture and related algorithms for solid modelling have been proposed which use load-balancing to distribute the work over a small number of very powerful processors. Such a solution does not appear to be scalable with problem size due to the cost involved in replicating such powerful processors.

Today, massively parallel processing systems have become available in the marketplace. For instance, the "Connection Machine" marketed by Thinking Machines, Inc., Cambridge, Mass. employs 65,536 processors, each processor being of limited capability and memory size. The processors are treated as an array by a front-end computer where a program is resident that controls the processors to carry out a highly parallel algorithm. It is important in such massively parallel systems, during the execution of a program, to avoid intercommunication between processors in the array. Such communications significantly slow the overall execution of an algorithm and, in some instances, render questionable the value of the massively parallel system (as compared to a serial system).

Solid or three-dimensional modelling algorithms employ a number of known data representations. A "solid" is a physical object whose boundary consists of planar pieces. Objects whose boundaries have curved surfaces are generally approximated using planar facets. Thus, a solid is described by planar pieces called faces; the line segments where faces meet are called edges; and the points where edges meet are termed vertices.

Complicated solids are formed by combining simpler solids, using operations such as union, intersection and difference. Practical computations on solids operate on the boundary representations of solids. Such calculations require relationships to be defined among the vertices, edges and faces. Such relationships are called "adjacencies".

Referring to FIG. 1, a cube is shown having six faces (A–F), 12 edges and 8 vertices. To accomplish the modelling and manipulation of the cube, a set of interrelated data structures has been suggested in the prior art (see Karasick, "On The Representation and Manipulation of Rigid Solids", PhD Thesis, McGill University, Montreal, Quebec, 1988; available as Cornell University Department of Computer Science Report 89-976, Ithaca, N.Y.). In that thesis, a Star-edge data structure is described for boundary representations of a solid, that is particularly useful in a serial computing environment. Karasick suggests that an additional artifact be added to the model to better enable the description of the solid. That added artifact is termed a directed edge (or d-edge). D-edges are shown in FIG. 1 in each of faces A–F. For instance, face A has d-edges 0–3; face B has d-edges 4–7, etc. It is to be noted in FIG. 1, that each edge of the cube (e.g., edge e between vertices u, v) has two associated d-edges, (i.e., 2 and 4) and each such d-edge respectively resides in a plane that contains edge e.

An edge e with Initial vertex u and Terminal vertex v can bound many faces. For each adjacent face f, it is necessary to describe whether the interior of face f is to the left or right of edge e. This is implemented using d-edges $e_f(+)$ and $e_f(-)$. D-edge $e_f(+)$ exists if the interior of face f is to the right of e. The left and right directions from edge e are determinable by standing at the Initial Vertex u of edge e and looking to its Terminal Vertex v. D-edge $e_f(-)$ exists if face f is to the left. More precisely, if N is an outward normal of face f, then $e_f(+)$ exists if $(v-u) \times N$ points from the interior of e into the interior of f. Similarly, $e_f(-)$ exists if $(u-v) \times N$ points from the interior of e into the interior of face f. D-edge $e_f(+)$ has Initial Vertex u and Terminal Vertex v. D-edge $e_f(-)$ has Initial Vertex v and Terminal Vertex u. In FIG. 1 (and FIG. 4) d-edges are represented as direction vectors.

D-edges incident to a vertex v and contained in a face f, are ordered by radially sorting their direction vectors in the plane of face f. Likewise, the d-edges associated with an edge e are ordered by radially sorting, about edge e, the faces in which they respectively reside.

The key adjacency relationships of the Star-edge representation are shown in FIG. 2. The Star-edge representation is conceptually straightforward, yet its realization as a data structure is complicated and difficult to implement efficiently.

It can be seen from FIG. 2 that each of three independent data sets, i.e., edges, faces, and vertices, has pointers both to d-edges associated with each face and, in two instances, pointers to each other. Such a data representation requires a large number of memory references each time a modeling algorithm is formed. Such a representations does not lend itself to highly parallel processing.

Accordingly, it is an object of this invention to provide an improved data structure for representing three-dimensional objects on parallel computing systems.

It is another object of this invention to provide a massively parallel architecture computing system with a data structure that enables highly parallel, processor-independent, modelling operations.

It is still another object of this invention to provide an improved method for assigning labels to a data representational structure of a model that enables a highly parallel architecture to operate with minimal inter-processor communications.

SUMMARY OF THE INVENTION

A parallel computing system is described that comprises a plurality of uniquely labeled, parallel processors, each processor capable of modelling a three-dimensional object that includes a plurality of vertices, faces and edges. The system comprises a front-end processor for issuing a modelling command to the parallel processors, relating to a three-dimensional object. Each parallel processor, in response to the command and through the use of its own unique label, creates a directed-edge (d-edge) data structure that uniquely relates an edge of the three-dimensional object to one face of the object. Each d-edge data structure at least includes vertex descriptions of the edge and a description of the one face. As a result, each processor, in response to the modelling command, operates upon a small component of the model and generates results, in parallel with all other processors, without the need for processor-to-processor intercommunication.

DESCRIPTION OF THE DRAWINGS

FIG. 3 is a high level block diagram of a massively parallel processing system for carrying out the invention.

FIG. 4 is a partial perspective view of the cube of FIG. 1, helpful in understanding the data structure of this invention.

FIG. 5 is a chart which shows a d-edge data structure, there being one such data structure per parallel processor.

DETAILED DESCRIPTION OF THE INVENTION

Figure 1:
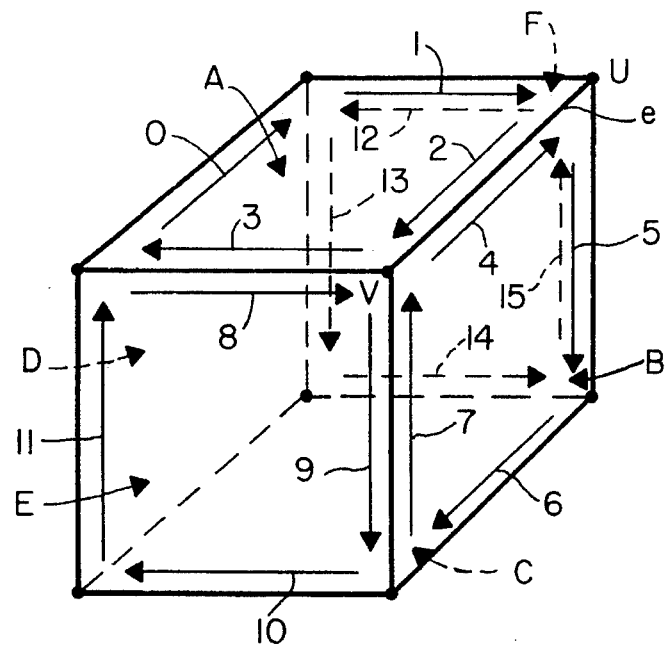
FIG. 1 is a perspective view of a cube illustrating various features of a prior art data structure used to represent faces, vertices and edges.
Figure 2:
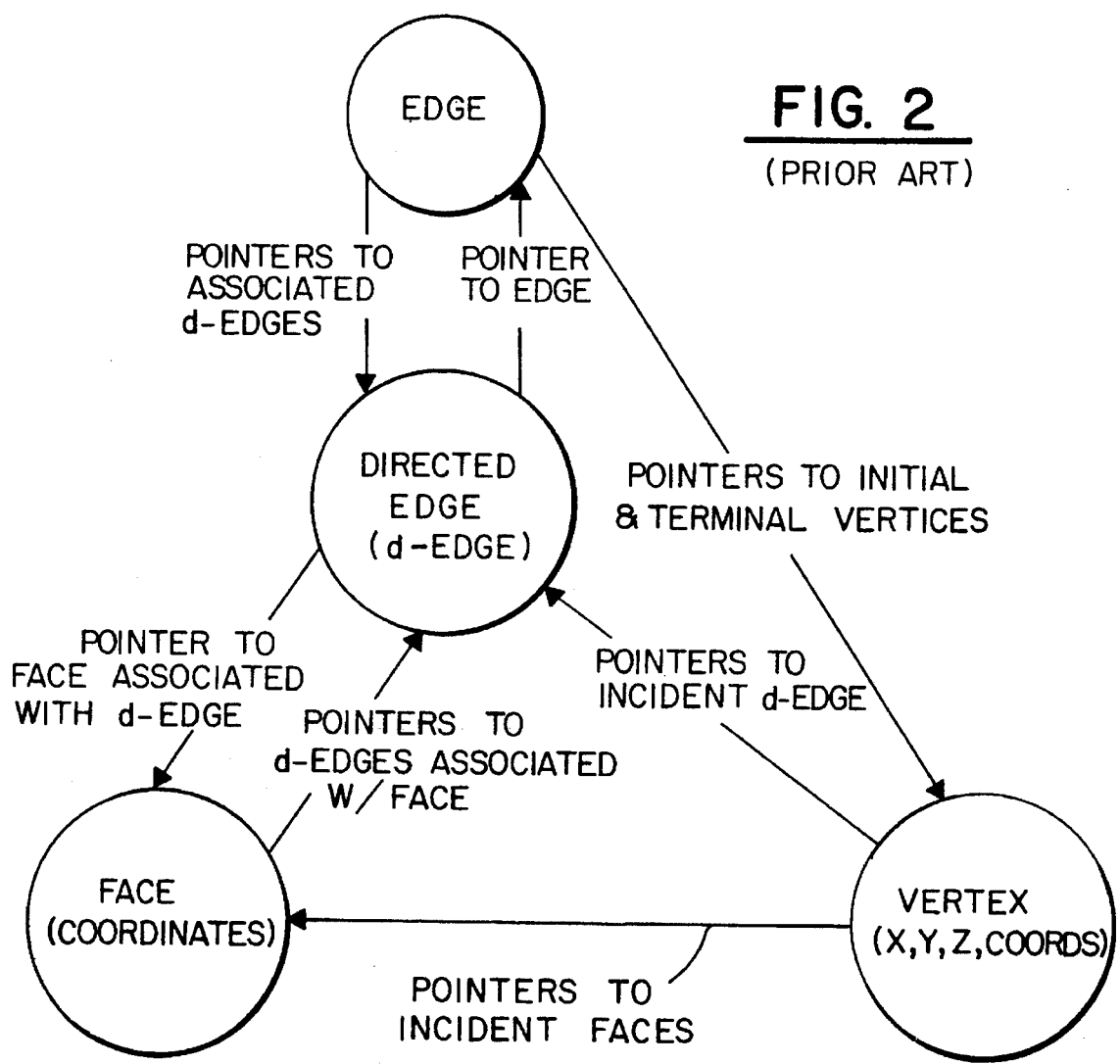
FIG. 2 is a chart indicating the data structure for the prior art representation shown in FIG. 1 and illustrates the various pointers which exist between the data structures to allow adjacencies to be determined.

Referring now to FIG. 3, a massively parallel processing system 50 is shown which comprises a front-end processor 52, a communications network 54, display 55 and a plurality of parallel processors 56. Front-end processor 52 contains the main control software for the system, 3 dimensional modelling software and communicates with each of processors 56 in parallel, through communications network 54. Each of parallel processors 56 has a preassigned label that uniquely identifies it amongst all the processors. That label may be an address, name, or other appropriately unique identifier.

The preferred embodiment of this invention contemplates that parallel processing system 50 operate synchronously, with each of processors 56 operating in lock-step. Nevertheless, it is to be understood that asynchronous operation is also contemplated amongst processors 56. In the preferred embodiment, a user instructs front-end processor 52 to execute its 3-D modelling program with respect to a specific solid object. In response, front-end processor 52, sequentially, issues instructions one by one, to all parallel processors 56, each instruction being executed, simultaneously by all processors 56.

As will be hereinafter understood, each of parallel processors 56 (i.e., $P_0$–$P_{n-1}$) responds to a modelling command from front-end processor 52 by commencing the modelling of a determined solid structure. As described above, each solid structure comprises a plurality of vertices, faces and edges. However, each individual processor (e.g. $P_1$) is assigned only one portion of the model to operate upon—and that portion of the model is determined by the processor's label that uniquely identifies the portion of the model to be worked upon.

As will be hereinafter understood, each of parallel processors 56 is assigned, by virtue of its label, a d-edge. The processor then constructs a d-edge data structure which uniquely associates the assigned d-edge with its associated object edge and face. The resulting data structure is sufficiently complete that each parallel processor can finish processing of many modelling commands with respect to its assigned d-edge without reference to or communication with other parallel processors 56. Thus, since all processors, in the preferred embodiment, operate in lock-step, the entire modelling function is performed in parallel and in minimal expended time.

Turning now to FIGS. 4 and 5, the derivation of a d-edge data structure in any parallel processor will be described. In FIG. 4, a partial view of the cube of FIG. 1 is shown. In FIG. 5, the actual d-edge data structure is shown, using as a model, the view of FIG. 4. In the foregoing discussion, it will be clear that each d-edge data structure is unique and is created in its assigned parallel processor 56. It is to be understood however, that the d-edge data structures could be created elsewhere and inserted into the various assigned parallel processors 56.

As above-described, Karasick has previously shown that d-edges may be created and radially ordered around vertices and edges. It is to be understood that d-edges are merely an artifact which enable a processor to associate a model edge with a face in which the d-edge resides. As can be seen from an examination of FIG. 5, each d-edge has an Initial vertex, a Terminal vertex, an associated edge, and an associated face. Each d-edge also has a bit designator indicating whether its direction is the same as or different from its associated edge. The solid of which the d-edge is a part also is provided with a label. Each Initial vertex, Terminal vertex and edge have precisely determinable labels and "successors", to be hereinafter described. A face, in addition to being provided with a label, has two additional pieces of data provided for it, i.e., a face normal vector and a face distance, from which the equation of the face is readily determinable.

The "initial vertex successor d-edge" is the label of a d-edge in a face f that is radially counterclockwise around the Initial vertex. Assuming that a data structure is being constructed for d-edge 2 of the model, its "Initial vertex successor d-edge" is d-edge 1, as shown by counterclockwise arrow 60 in FIG. 4. The "Initial vertex label" of d-edge 2 is 12. (The manner of assignment of the value to the Initial vertex label will be described below.) The "Terminal vertex successor d-edge" is the label of the d-edge in the face containing d-edge 2, that is radially counterclockwise around its terminal vertex 8 (as shown by curved arrow 62 in FIG. 4). D-edge 3 fulfills this requirement. The "Successor around d-edge 2" is the label of the radially counterclockwise d-edge around edge e from d-edge 2. This relationship is shown by curved arrow 64 in FIG. 4 and designates d-edge 4.

The equation of the plane in which d-edge 2 is located is represented by a unit normal vector drawn outward from the volume of the solid (not shown), and the face distance is a signed distance of the plane of the face from the origin. It is to be understood that the counterclockwise convention, as described above could just as readily be a clockwise convention, so long as all conventions are consistently applied.

A d-edge's label invariably corresponds to the name or label of the processor assigned to contain the respective d-edge data structure. For example, a cube is defined by 12 edges and 24 d-edges. Thus, 24 processors are used to describe the cube, each processor assigned to contain a single d-edge data structure.

To enable the d-edge data structure to function efficiently, a canonical assignment of labels to edges, faces, vertices, and d-edges is preferred. The canonical labelling has the following properties: uniqueness—no two distinct boundary elements (i.e., face, edge or vertex) of the same type have the same label; incidence—each boundary element is labeled by an incident d-edge; and intersection—given a canonically labelled solid, and either of a point, line, or plane, no two distinct boundary elements of the solid, with the same label have point intersections with the point, line, or plane. For instance, a plane cannot transversely intersect an edge and a vertex with the same label.

The algorithm for computing the labelling is as follows:

1. Each d-edge acquires the label of the processor to which it is assigned.

2. Label face f with the largest label of a d-edge in face f.

3. Label edge e with the largest label of a d-edge associated with edge e; and

4. Label Terminal vertex v with the largest label of a d-edge sharing that vertex v as a Terminal vertex.

5. Label Initial vertex u with the largest label of a d-edge sharing that vertex u as a Terminal vertex.

The above algorithm clearly includes some choices which may be altered by the user. For instance, while it is indicated that largest labels be employed in the labeling actions, it could be, conversely, the smallest labels. Likewise, with respect to steps 4 and 5 above, the Initial vertex could be chosen in lieu of the Terminal vertex as the base from which the label assignment is made. It is important in any of the above choices, that the assigned label be unique and readily determinable.

The d-edge data structure allows information about d-edges, not contained in the data structure to be readily computed without inter-processor communication. For instance, various direction vectors are derivable from the data structure shown in FIG. 5. Furthermore, solid modelling algorithms require the selection of boundary elements that satisfy certain requirements. When calculating the intersection of solids, it is necessary to select the d-edges of a given face. In serial processors, this requires examination of several data structures. By contrast, such computations using the d-edge data structure shown in FIG. 5 (on a massively parallel processor) is done by selecting a set of processors for a calculation and then performing the calculation on that set of active processors. For example, selection of the d-edges of a face is accomplished by activating those processors whose face label matches the given face (a type of associative selection efficiently done on parallel processing systems).

An example will now be considered which will illustrate the various label assignments in accordance with the above canonical algorithm.

As already indicated, each parallel processor executes modelling software instructions that enable the processor to construct representations of certain elemental three-dimensional objects.

Assuming that the front-end processor is instructed to "Make Cube" and is given the cube's length, width, and height, it commences by issuing instructions to all processors 56 to carry out the command. In response, each parallel processor builds only one d-edge of the cube, that d-edge being dependent upon a preassignment to the processor of a particular d-edge of the cube.

In front-end processor 52, the modelling software system knows that a cube has 24 d-edges and preassigns those d-edges to the various faces of the cube. As shown in FIG. 4, d-edges 0–3 are assigned to the top face of the cube, whereas d-edges 4–7 are assigned to the right face of the cube, etc.

Processor $P_2$, for example, handles d-edge 2 and the calculations with respect thereto. Processor $P_2$ is thus instructed to produce a d-edge data structure for d-edge 2, and is also instructed where d-edge 2 resides in the model. Processors $P_0$, $P_1$, and $P_3$ each handle the calculations with respect to d-edges 0, 1, and 3 respectively.

Processor $P_2$ proceeds by calculating the coordinates of the vertices of d-edge 2 and the face equation for the face in which d-edge 2 resides. Processor $P_2$ then calculates the various labels for each element of the data structure shown in FIG. 5. The label for the face in which d-edge 2 resides is determined in accordance with step 2 of the canonical assignment algorithm. That face is assigned the label value of 3 since d-edge 3 has the largest label value of all d-edges within that face.

Processor $P_2$ is then instructed to proceed to label the edge e that is associated with d-edge 2 with the largest value label of an associated d-edge. As can be seen from FIG. 4, edge e is associated in face 3 with d-edge 2 and in face 7 by d-edge 4. As a result, edge e is assigned a label value of 4 in accordance with step 3 of the canonical algorithm. Next, vertex labels are determined in accordance with steps 4 and 5 of the algorithm. It will be recalled that d-edge 2 shares the same vertices as does edge e (now assigned a value of 4). The leftmost vertex of d-edge 2 is its Terminal vertex v and, in accordance with step 4, it is assigned a value of 8, as d-edge 8 has the largest value of any d-edge which shares that vertex as its Terminal vertex. It should be noted that d-edge 9 also shares that vertex, but as an Initial vertex so its value is not assigned.

In accordance with step 5, the label of Initial vertex u of d-edge 2 is determined by an examination of the d-edges which share u as a Terminal vertex. From FIG. 4 it can be seen that the largest value d-edge sharing vertex u as a Terminal vertex is d-edge 15 and thus the vertex is assigned the value of 15.

Processor $P_2$ now turns to determining the various "successor d-edge" values. The "Initial vertex successor d-edge" value (as determined with reference to d-edge 2) is d-edge 1, as shown by curved line 60 in FIG. 4. The "Terminal vertex successor d-edge" is shown by curved line 62 as being d-edge 3, whereas the "Successor around d-edge 2" is, as shown by curved arrow 64, d-edge 4. A direction bit is then determined for d-edge 2 and as it is oriented in the same direction as its associated edge e, a +1 value is assigned. (If it was oppositely oriented, a −1 value would be assigned.) Also, a solid label may be assigned to the cube, but that is arbitrary and not necessarily related to any of the aforementioned values. Each of the above determined values is entered in the data structure shown in FIG. 5, as it is determined.

At this stage of the processing, each parallel processor now contains a complete d-edge data structure for its respectively assigned d-edge. These data structures enable an efficient recovery of embedded data, with minimal or no intercommunication between the parallel processors. The following are several examples of such data recovery.

EXAMPLE 1

Assume that it is desired to draw "face 5" of a modelled object on the screen of the display. The front end processor generates a request to every processor ($P_0$–$P_{n-1}$), whose face label is equal to 5 to generate instructions that will enable a display to show its assigned "d-edge" of face 5 on the display. In response, each processor looks at its face label and determines if it is equal to 5 and, if so, it then has all the necessary information, without further inter-processor communication, to provide instructions to a display that will enable the display to construct its respective edge portion of face 5. Each processor then provides its particularly assigned edge to the display which combines them and displays the entire face.

EXAMPLE 2

This example illustrates how embedded data can be recovered and manipulated and indicates why the data structure does not require separate storage of face, edge and vertex data lists. Assume the command is to translate a 3-D object in space in a vector defined direction. The front end processor generates a command that every d-edge translate itself along a vector V by a distance L. Each processor responds to that command by modifying the Initial and Terminal vertex coordinates of its assigned d-edge and further, modifies the face equation of the associated face. All of the processors, in parallel, provide the revised data to a display which configures the translated edges and displays the view.

As indicated above, many processor functions are enabled to occur without inter-processor communication through the use of the d-edge data structure. However, individual parallel processors, in the course of 3-D modelling problems will, on occasion, have to consult other processors. Such communications are often required when intersecting a solid with another solid and performing the calculations with respect thereto. The time required for inter-processor communication can be reduced by relocating d-edges in accordance with the following teachings.

Figure 6:
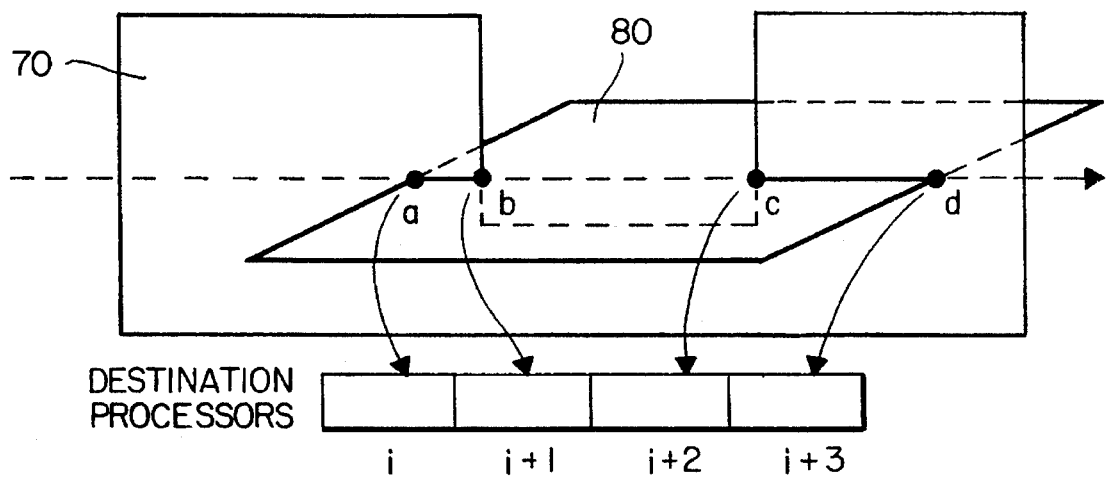
FIG. 6 is a schematic diagram illustrating the intersection of two planes and showing how points of intersection therebetween are ordered and placed in contiguous parallel processors.

As shown in FIG. 6, assume that face 70 intersects face 80 and that intersection points a–d are resident in different parallel processors. If it is wished to construct an edge between the intersection points of the individual processors handling intersection points a and b, and another edge between the intersection points of the processors handling intersection points c and d, communications are required between the processors of each pair. However, it is unlikely that the path lengths between the communicating processors are small.

Those path lengths may be minimized by ordering the points of intersection along a straight line (which will occur considering that object faces are all planar). Each of the intersection points is ranked in order of position along the straight line and is distributed to contiguous destination processors in accordance with its ranking. Thus, as shown in FIG. 6, intersection point a is placed in processor i; intersection b in processor i+1 etc. After this ranking and intersection point placement is completed, subsequent communications are between nearest neighbors and communication time losses are minimized.

Figure 7:
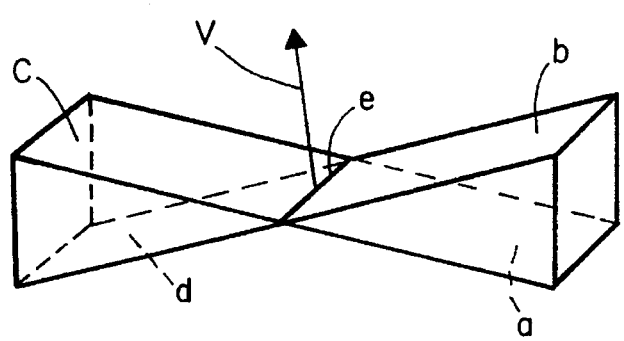
FIG. 7 is a three-dimensional view of a complex solid that is intersected by a vector.

A similar ranking can occur along d-edges that are angularly disposed, one from the other. Many solid modelling procedures can be expressed as neighborhood classifications. For example, as shown in FIG. 7, given an edge e of a solid and a vector V perpendicular to e, it may be useful to know whether V points into the solid. It can be recalled that the d-edges associated with an edge e are radially ordered around edge e. Recall that the field "successor around d-edge" contains the label of the next d-edge around edge e. That label corresponds to the parallel processor number that includes the "next" d-edge's data structure, from which can be obtained the label of the face that contains the "next" d-edge (etc.). By determining which face is immediately counterclockwise to vector V, it can be classified. Each processor that contains a d-edge associated with edge e calculates the angle between vector V and its respective face. The thus calculated angles are then radially ordered and the radial orderings are used to find physically adjacent processors where the associated d-edges are relocated.

Figure 8:
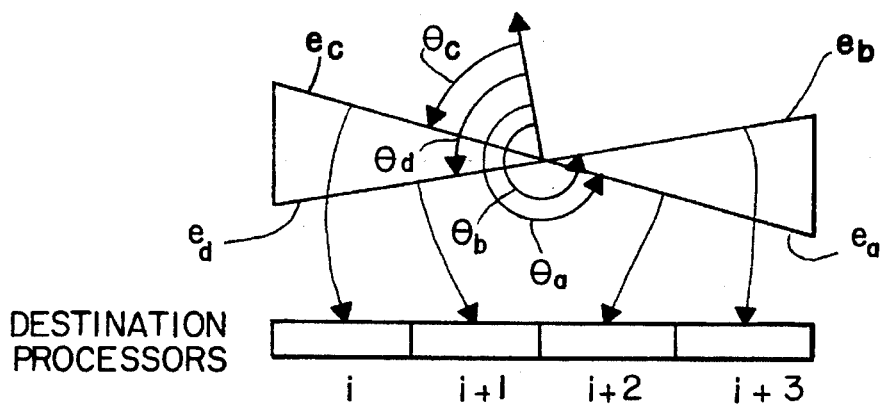
FIG. 8 is a view taken perpendicular to edge e in FIG. 7 that indicates how the angles between the respective d-edges are determined, ordered and then used to place associated d-edges into contiguous parallel processors.

This relocation operation is shown schematically, in FIG. 8 wherein a d-edge associated with each of planes a, b, c, and d in FIG. 7 is shown, looking at edge e end-on. As above-described, angles $\theta_a$, $\theta_b$, $\theta_c$ and $\theta_d$ are calculated by the parallel processors containing d-edges $e_a$–$e_d$. Then, those angles are ordered in accordance with their size and the various d-edges are reassigned to processors i, i+1, i+2 etc., in accordance with the angular ordering.

As another example, given a vertex u and a face f of a solid, and given a vector V contained in the plane of face f, it may be useful to know whether vector V points into face f. By determining which d-edge adjacent to vertex u is immediately counterclockwise to vector V, it can be classified. Each processor containing a d-edge adjacent to vertex u calculates the angle to vector V. The thus calculated angles are then radially ordered and the radial orderings are used to find physically adjacent processors where the associated d-edges are relocated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for modelling a three-dimensional object that includes vertices, faces and edges, said method implemented on a parallel computing system which includes a front and processor for issuing modelling instructions and plural modelling processors responsive to said modelling instructions, each modelling processor having an assigned unique label, said method comprising the steps of:

storing directed-edge (d-edge) data structures in a plurality of said modelling processors, each d-edge having a label equal to the unique label of the modelling processor in which it is stored, a plurality of d-edges defining a face of said three-dimensional object, said plurality of d-edges sequentially valued, said face having a label equal to one of a sequentially valued d-edge, said data structure defining a d-edge with at least vertex descriptions of an associated edge of said face and a description of said face;

issuing an instruction to said modelling processors to model at least a face of said three-dimensional object, said instruction including a designation of said face;

enabling each said modelling processor to determine if a d-edge data structure having a label equal to the label of said face that is to be modeled, is stored therein; and operating each said modelling processor which includes a d-edge data description equal to the label of said face, to execute, simultaneously with all other modelling processors including a d-edge data description equal to the label of said face, a modelling instruction with respect to each said stored d-edge data description stored therein.

2. The method as recited in claim 1 wherein each said edge of a three-dimensional model is defined by a plurality of intersecting faces, each intersecting face including a d-edge that is associated with an edge of said face, each said d-edge that is associated with an edge being ordered in a predetermined direction about said edge, said predetermined direction determined in relation to a vector direction of said edge as determined by initial and terminal vertices of said edge.

3. The method as recited in claim 2 wherein d-edges present in a face are ordered in a predetermined direction about said face.

4. The method as recited in claim 1 comprising the further step of:

after said operating step, causing each said modelling processor to issue, in parallel with all other modelling processors, instructions to display an edge that is derivable from a d-edge data structure that has been modified in a modelling processor in accordance with said modelling instruction.

5. A method for modelling a three-dimensional object that includes vertices, faces and edges, said method implemented on a parallel computing system which includes a front and processor for issuing modelling instructions and plural modelling processors responsive to said modelling instructions, each modelling processor having an assigned unique label, said method comprising the steps of:

storing directed-edge (d-edge) data structures in a plurality of said modelling processors, each d-edge having a label equal to the unique label of the modelling processor in which it is stored, a plurality of d-edges defining a face of said three-dimensional object, said plurality of d-edges sequentially valued, said face having a label equal to one of a sequentially valued d-edge, said data structure defining a d-edge with at least vertex descriptions of an associated edge of said face and a description of said face;

finding points of intersection between edges of at least a pair of intersecting faces of said three-dimensional object by employing stored d-edge data structures in said plurality of modelling processors; ordering said points of intersection; and distributing said ordered points of intersection into a contiguous sequence of said plural modelling processors for further processing that involves said ordered points of intersection, whereby interprocessor communication links are minimized when such processing occurs.

6. A method for modelling a three-dimensional object that includes vertices, faces and edges, said method implemented on a parallel computing system which includes a front and processor for issuing modelling instructions and plural modelling processors responsive to said modelling instructions, each modelling processor having an assigned unique label, said method comprising the steps of:

storing directed-edge (d-edge) data structures in a plurality of said modelling processors, each d-edge having a labels equal to the unique label of the modelling processor in which it is stored, a plurality of d-edges defining a face of said three-dimensional object, said plurality of d-edges sequentially valued, said face having a label equal to one of a sequentially valued d-edge, said data structure defining a d-edge with at least vertex descriptions of an associated edge of said face and a description of said face, said data structure further including a value for said d-edge which provides said d-edge with an order value in relation to other d-edges that share a common vertex;

determining an orthogonal vector to an edge having a vertex equal to said common vertex;

finding angles between said orthogonal vector and each of a plurality of d-edges that are ordered about said common vertex, said angles measured in a predetermined direction about said common vertex; and distributing said d-edges in order of their found angles into a sequence of contiguous modelling processors to enable minimization of inter-processor communication lengths for further processing involving said d-edges.

* * * * *

UNITED STATES PATENT AND TRADEMARK OFFICE
CERTIFICATE OF CORRECTION

PATENT NO. : 5,488,692
DATED : Jan. 30, 1996
INVENTOR(S) : Karasick, et al

It is certified that error appears in the above-indentified patent and that said Letters Patent is hereby corrected as shown below:

In col. 10, line 40, claim 6, "labels" should be --label --.

Signed and Sealed this

Twenty-eighth Day of May, 1996

Attest:

BRUCE LEHMAN

*Attesting Officer*       *Commissioner of Patents and Trademarks*